April 7, 1925.  S. O. BUMGARNER  1,532,987
GATE AND OPERATING MECHANISM
Filed April 7, 1922   3 Sheets-Sheet 2
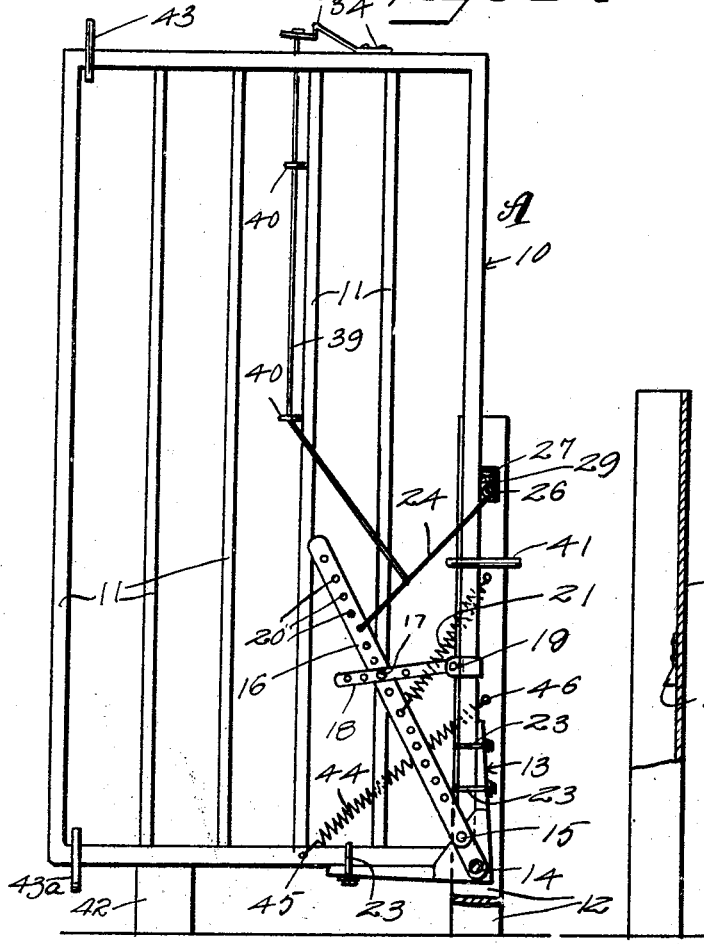
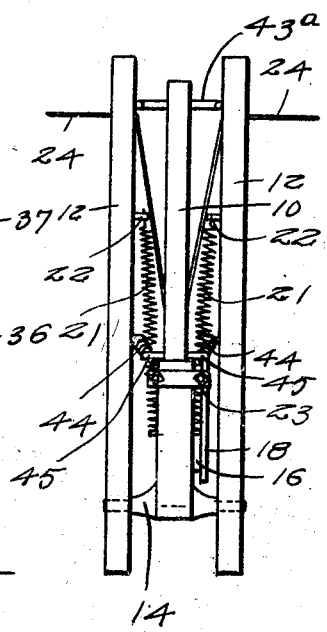
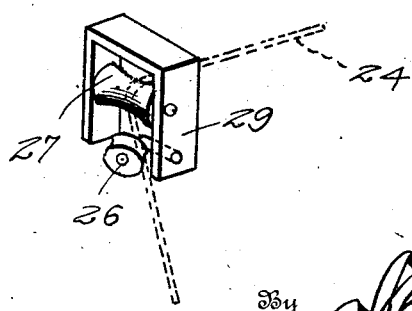
Inventor
S. O. Bumgarner
By
Attorney April 7, 1925.
S. O. BUMGARNER
1,532,987
GATE AND OPERATING MECHANISM
Filed April 7, 1922     3 Sheets-Sheet 3
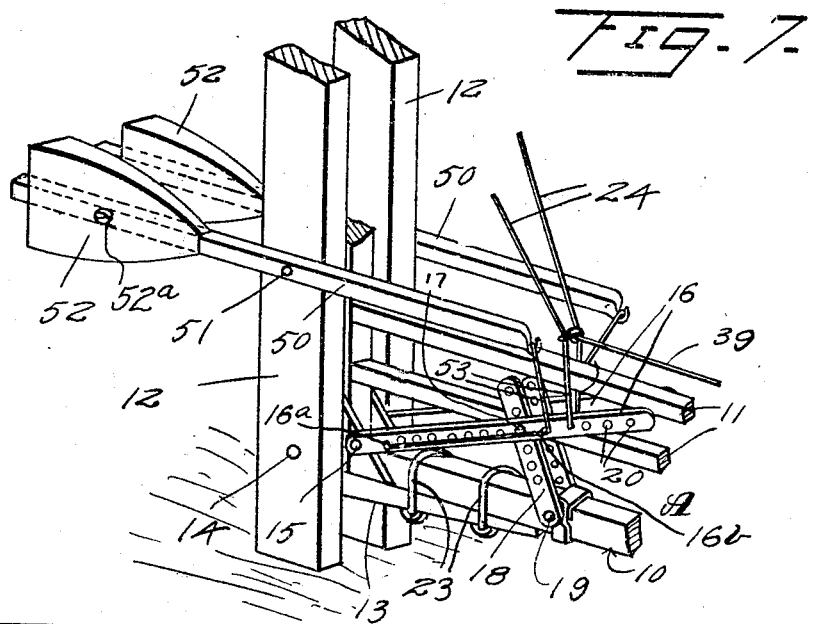
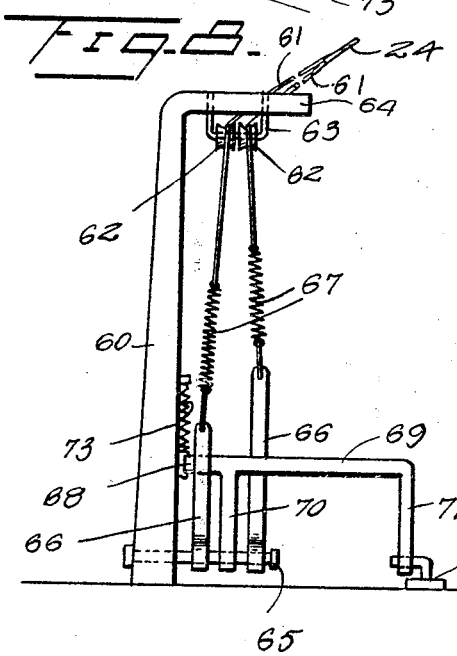
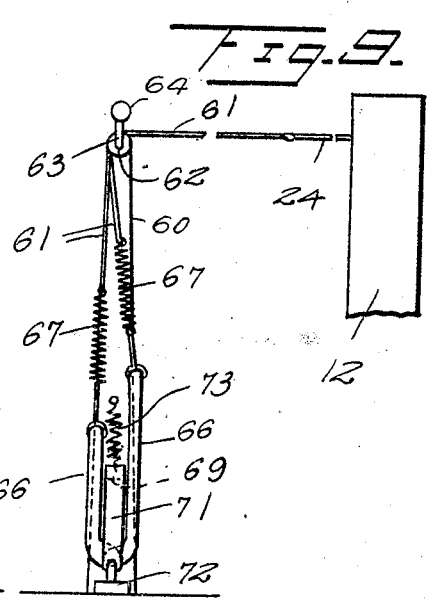
Inventor
S. O. Bumgarner Patented Apr. 7, 1925.

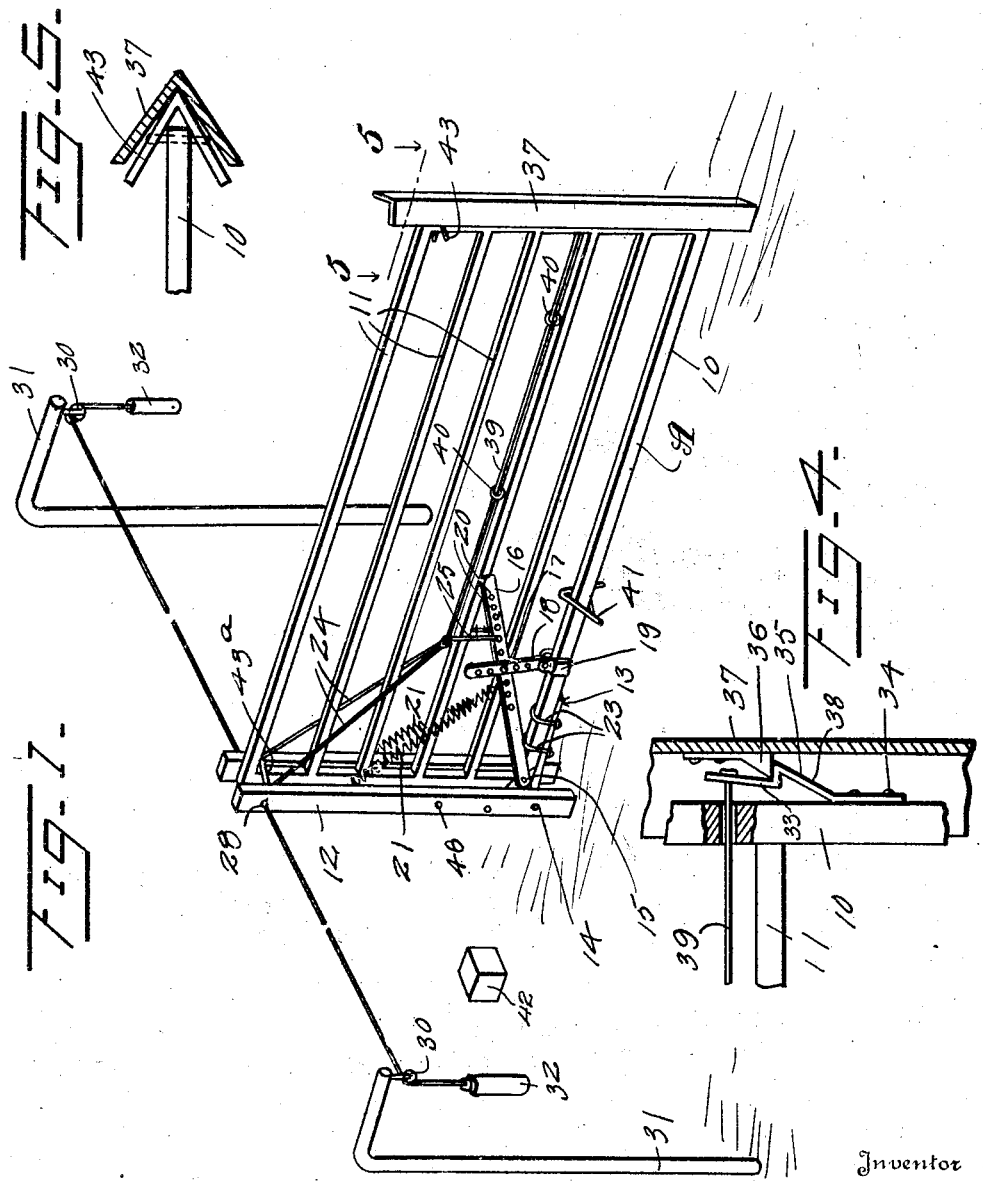

1,532,987

UNITED STATES PATENT OFFICE.

STEPHEN O. BUMGARNER, OF WAVERLY, OHIO.

GATE AND OPERATING MECHANISM.

Application filed April 7, 1922. Serial No. 550,309.

*To all whom it may concern:*

Be it known that I, STEPHEN O. BUMGARNER, a citizen of the United States, residing at Waverly, in the county of Pike and State of Ohio, have invented certain new and useful Improvements in Gate and Operating Mechanism; and I do hereby declare the following to be a full, clear, and exact description of the invention, such as will enable others skilled in the art to which it appertains to make and use the same.

This invention relates to a gate and operating mechanism therefor.

One prime object is to provide a means or attachment to render an ordinary farm gate automatic.

Another object is to provide a novel construction of gate which may be elevated bodily in a vertical plane from an open to a closed position and vice versa, in combination with balance means such as weights or springs, and in combination with manual or vehicle-operative means for moving the gate from and to its different positions and preferably to also actuate a latch mechanism therefor; to provide a novel hinge structure to reinforce and support the gate adjacent its fulcrum; to provide a novel means on the gate for engagement with its supports to limit movement of the gate; to provide a novel adjustable connection on said hinge for the draw means to actuate the gate and for a balance spring, to adjust the tension of the latter; and to provide novel mounting means for the draw members and pulleys.

Additional objects and advantages will become apparent from a consideration of the description following taken in connection with accompanying drawings illustrating practical embodiments.

In said drawings:

Figure 1 is a view in perspective illustrating the form of the gate employed by the springs and with the gate in a closed position;

Figure 2 is a side elevation of said gate showing the latter in an elevated or open position;

Figure 3 is a rear view of the gate and particularly illustrating its pivotal connection;

Figure 4 is a fragmentary detail sectional view, illustrating the gate latch proper;

Figure 5 is a detail cross sectional view on the line 5—5 of Figure 1, illustrating the connection of the abutment block with the latch post;

Figure 6 is a detail perspective view illustrating the guide rollers at the mounting post over which the draw members pass;

Figure 7 is a detail perspective view of a modified form of gate illustrating the use of balance weights and levers in lieu of the balancing spring of the previous form, one position being shown in full line and the other position being shown in dotted lines;

Figure 8 is a front elevation of a means for vehicle-operation of the gate; and

Figure 9 is an edge elevation at a right angle to Figure 8.

Like reference characters designate like or similar parts in the different views.

My improvement has been shown in connection with a conventional gate as at A. It may be substantially rectangular in form and consists of a marginal frame 10 and intermediate longitudinal bars 11.

At the hinge end, the gate is disposed intermediate the gate post or upright as at 12 which may be driven into the ground or otherwise secured or supported.

A novel form of hinge for the gate is employed as best shown in Figures 2 and 3. This hinge consists of an angle bracket having arms disposed at a right angle to each other as at 13, and preferably tapered or thickened in the direction of their junction to reinforce the same. At said junction, pintles or pins 14 project laterally and are journaled one in each of the posts 12. The pins 14 provide an axis on which the gate may be swung from the closed position of Figure 1 to the open position of Figure 2.

Pivoted to the bracket as at 15, is an arm 16, capable of being adjusted in a vertical plane and being secured rigidly in adjusted position by means of a bolt 17 passing therethrough detachably and through an adjusting arm 18 pivotally mounted at 19 on the frame 10. It will be noted that the arms 16 and 18 have a plurality of openings 20 therethrough adapted to be brought into desired registry to receive the bolt 17 according to the adjustment of the arm 16 desired. Suitably connected in desired openings 20 of said bars 16, are coil springs 21 which are also fastened as at 22 to the posts 12. These springs 21 serve to balance the gate in both its closed and open positions and are movable with the gate so that their lower ends will be swung from a position to the right of the post 12 to a position to the left of said post 12.

Any suitable means may be employed to secure the hinge to the gate. The gate is placed with one corner thereof in contact with the arms 13 and one form of fastening may consist of detachable U-bolts 23 carried by said arms 13 and adapted to overlap or surround the frame 10.

The gate is adapted to be actuated from either side thereof and to this end a plurality of draw cords or other flexible elements are provided as at 24. Draw elements 24 are connected as at 25 in suitable openings 20 of the arms 16 and they pass over guide pulleys or rollers at 26 and 27 and then through guide openings 28 in the post 12. Pulleys 26 and 27 are suitably journaled on a block or base 29 fastened to the post 12. Adjacent their free ends and at a distance from the gate, draw elements 24 are trained over guide pulleys 30 suspended from uprights 31 driven into the ground or otherwise secured in place. The terminals of draw members 24 preferably have grips or the equivalent at 32.

A latch mechanism is preferably provided for the gate and to this end it may consist of a resilient leaf or bar 33 secured at 34 to the forward end thereof. This latch has a securing lug at 35 adapted to coact with a securing lug 36 carried by a latching post 37. The latching post 37 is preferably V-shaped or channeled in cross section and disposed so that the gate will move into and out of the channel. It will be noted that the under surface of the lug 35 as at 38 is beveled in order that as the gate moves downwardly, the surface 38 will ride on the lug 36 and after it has passed the same, will snap into underlapping relation therewith so that the gate cannot be raised under action of small animals or otherwise until the latch is released. Draw wires or elements of a flexible nature are provided at 39, connected at one end to the draw members 24 at 25 and at the other end to latch 33. Draw members 39 pass through and are guided in eyelets or the like at 40 clamped or secured to one of the longitudinal bars 11.

On the frame 10, a substantially triangular stop is provided at 41 arranged so that a point thereof will enter between the posts 12 when the gate is swung to an open position in order to limit its movement to that position and prevent undue strain on the parts. In such open position, the gate may engage a rest or support, anchored in the ground or otherwise fastened as at 42. At 43, a stop similar to the stop 41 is provided to fit against the interior of the walls of post 37 to permit movement of the gate to a closed position and to brace the same in such position. Another stop at 43ª, similar to stops 41 and 43, is secured to frame 10 to fit between posts 12 in order to rigidify the gate in closed position.

In order to open the gate, with the same in a closed position as shown in Figure 1, either of the grips 32 is engaged by the operator and pulled in a direction away from the gate which causes the gate to swing upwardly and rearwardly to the position shown in Figure 2, during which action, the springs 21 at their forward ends move from the right of the post 12 to the left of the post 12, thus serving to balance the gate in both positions. In order to close the gate from the position of Figure 2 to that of Figure 1, either of the grips 32 may be engaged manually and pulled in a direction away from the gate which will tilt the gate upwardly and forwardly on its fulcrum 14 to the closed position shown in Figure 1. It will be realized that a draw or pull exerted on either element 24 will correspondingly draw or pull the elements 39 so as to move the latch 33 inwardly to disengage it from the lug 36. Also, as the gate descends, the inclined surface 38 rides on the lug 36 which forces the lug 35 away from the lug 36 until it is in a position below the lug 36. Stops 41 and 43 serve to limit movement of the gate to its two positions and to reinforce the gate in such positions. When desired, the tension of the springs 21 or the leverage required for raising and lowering the gate may be varied through the relative adjustment of the bars 16 and 18 and bolts 17.

In order to reduce the leverage required for moving the gate to a closed position, one or more springs may be employed as at 44. Such springs at one end as at 45 are secured to the frame 10 and at their other ends as at 46 are secured to the post 12. Springs 44 are of the coil contractile type and thus when the gate is moved to an open position, such springs are tensioned. When the gate is swung toward a closed position, the springs serve to assist in the movement of the gate.

In lieu of the springs 21, weight means may be employed to balance the gate as is illustrated in Figure 7. To this end, two levers are preferably utilized as at 50 being pivoted at 51 to the posts 12. The rear ends of the levers have weights 52 adjustably slidable thereon and secured thereto by set screws 52ª and at their forward ends, chains or other flexible connections 53 are fastened. Connections 53 are also secured to the bar 16 as at 16ª, passing over guide pins 16ᵇ and are employed in lieu of the springs 21. When the gate is closed, said levers 50 are in practically horizontal position. When the gate is opened, the levers move to a vertical position as will be understood. The pins 16ᵇ permit the gate to stand perpendicular when open without pulling weights 52 into the roadway.

Instead of operating the gate by hand, it may be operated through travel of a vehicle. Referring now to Figures 8 and 9, a post 60 is provided, one on each side of the gate in lieu of the post 31. The draw elements 24 in this instance are shorter and each of said draw elements has a plurality of branches at 61 which pass over suitable guide pulleys 62 journaled in a bracket 63 secured to the lateral arms 64 of the post 60. A bracket 65 extends from the post 60 and a plurality of upstanding bars or levers 66 are pivoted thereto for movement in a vertical plane. Draw branches 61 are connected to the bars 66 and in each of said branches a relatively strong contractile spring 67 is provided to normally tension the draw members 61 and maintain the levers or bars 66 in an upstanding position. Movable intermediate the bars 66 is a lug 68 of a tread device 69, pivoted on a horizontal axis, as by a lug 70 to the bracket 65 and by a lug 71 to an anchor 72. Tread 69 is normally maintained in an upstanding or vertical position by a contractile spring 73 secured thereto and to the post 60.

The construction shown in Figures 8 and 9 may be employed on one side of the gate only but is preferably employed on both sides. Presuming that a vehicle is traveling toward the gate, its wheels will pass over the tread 69 moving it toward the gate and against the ground, correspondingly moving the lever 66 engaged thereby, drawing the branch 61 and accordingly draw element 24 elevating or raising the gate. Thereafter, if the vehicle should travel in the opposite direction, tread 69, which has in the meantime been restored to the vertical position under urgency of spring 73, will be depressed against the ground by movement in the opposite direction, accordingly moving the other levers 66 and drawing the other branch 61 causing the draw element 24 to urge the gate to a lowered position.

As merely practical embodiments have been illustrated and described to indicate the nature of the invention, it is to be understood that changes in the details may be resorted to provided they fall within the spirit and scope of the invention.

I claim as my invention:—

1. A gate, having a bracket provided with arms secured to said gate at a corner thereof, pivot members extending laterally from said bracket, gate posts between which the gate moves and in which said members are pivoted, a latch post having a lug, a latch on the gate cooperating with said lug, an arm pivoted to said bracket, a second arm, said second arm being pivoted to said gate, means to secure said pivoted arms in adjusted position, brackets secured to said posts, pulleys on the latter brackets, draw members guided by said pulleys and connected with one of said pivoted arms, draw members extending from the said draw members to said latch, springs connected to said posts and to one of said arms, and springs connected to said posts and to said gate for tensioning through opening movement of the gate for the purpose specified.

2. A gate, a supporting post, draw members operable to shift said gate, guide means on said post engaged by said members, springs in said members, a bracket on said post, levers pivoted to said bracket and to said draw members, an actuating lever disposed intermediate said levers and directly engageable by the vehicle for passage thereover to actuate the first mentioned levers, and means to maintain the last mentioned lever in upstanding position.

3. In a gate, spaced supporting members, means pivoting a gate between said members for movement on a horizontal pivot, a stop on said gate engageable with said members to limit the movement of the gate when moved to open position, said stop being substantially pointed to facilitate said engagement, a second stop on said gate, and said second stop engageable with a latch post to limit the movement of said gate when moved to closed position.

In testimony whereof I affix my signature in presence of two witnesses.

STEPHEN O. BUMGARNER.

Witnesses:
JOHN W. BYRON,
MARIE BYRON.